(12) United States Patent
Flint et al.

(10) Patent No.: US 12,224,847 B2
(45) Date of Patent: Feb. 11, 2025

(54) COMMUNICATION SYSTEM WITH DUAL MODE RELAY SENSOR DELIVERY

(71) Applicant: Government of the United States, as represented by the Secretary of the Air Force, Wright-Patterson AFB, OH (US)

(72) Inventors: Spencer Flint, Seattle, WA (US); Erin Leslie, Oklahoma City, OK (US); Nathaniel Bowen, Columbus, MS (US); Michael Anderson, Colorado Springs, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 238 days.

(21) Appl. No.: 17/936,964

(22) Filed: Sep. 30, 2022

(65) Prior Publication Data

US 2023/0224020 A1 Jul. 13, 2023

Related U.S. Application Data

(63) Continuation-in-part of application No. 17/656,175, filed on Mar. 23, 2022, now Pat. No. 11,838,094, and
(Continued)

(51) Int. Cl.
*H04B 7/00* (2006.01)
*B64C 39/02* (2023.01)
(Continued)

(52) U.S. Cl.
CPC ....... *H04B 7/18504* (2013.01); *B64C 39/024* (2013.01); *B64U 70/90* (2023.01); *G05D 1/0022* (2013.01); *B64U 2101/60* (2023.01)

(58) Field of Classification Search
CPC ... H04B 7/18504; B64C 39/024; B64C 39/02; B64U 70/90; B64U 2101/60;
(Continued)

(56) References Cited

U.S. PATENT DOCUMENTS

7,542,828 B2 * 6/2009 Steele ................... B64U 10/25
244/75.1
8,054,177 B2 * 11/2011 Graves ................. A61B 5/1113
340/539.12
(Continued)

*Primary Examiner* — Yonel Beaulieu
(74) *Attorney, Agent, or Firm* — AFMCLO/JAZ; Larry L. Huston (57) ABSTRACT

A communication system for sending surveillance signals in a hostile environment to an operator. The communication system comprises a plurality of relay sensors to transceive collected data between sequential relay sensors and ultimately to an operator. The communication system has a tractor for dispensing plural relay sensors throughout the hostile environment. The sensors may be dispensed by an elevator to a position where a relay sensor can be retrieved by a drone for placement to maintain line of sight communication. And relay sensors can be dispensed directly from the tractor to the ground or water. Direct dispensing of the relay sensors can occur through a hole in tractor or off a ramp.

18 Claims, 10 Drawing Sheets

Related U.S. Application Data a continuation-in-part of application No. 17/655,853, filed on Mar. 22, 2022, now Pat. No. 11,995,996, and a continuation-in-part of application No. 17/667,824, filed on Feb. 9, 2022.

(60) Provisional application No. 63/298,489, filed on Jan. 11, 2022.

(51) Int. Cl.
  *B64U 70/90* (2023.01)
  *G05D 1/00* (2024.01)
  *H04B 7/185* (2006.01)
  *B64U 101/60* (2023.01)

(58) Field of Classification Search
  CPC ............ B64U 2101/00; B64U 2101/30; G05D 1/0022; G05D 1/0094; G05D 1/00
  See application file for complete search history.

(56) References Cited

U.S. PATENT DOCUMENTS

| | | | |
|---|---|---|---|
| 8,755,965 B1* | 6/2014 | McClintic | G09B 9/48 |
| | | | 701/23 |
| 9,841,757 B2 | 12/2017 | Mikan et al. | |
| 10,134,290 B2 | 11/2018 | Mikan et al. | |
| 10,207,805 B2 | 2/2019 | Evans | |
| 10,315,528 B1 | 6/2019 | Crawford | |
| 10,789,567 B1 | 9/2020 | Ur | |
| 11,655,048 B2 | 5/2023 | Sugimoto et al. | |
| 12,024,738 B2* | 7/2024 | Zimmermann | C12Q 1/6886 |
| 2019/0086920 A1 | 3/2019 | Miller | |
| 2023/0271731 A1* | 8/2023 | Anderson | B64C 39/024 |
| | | | 701/3 |

* cited by examiner

COMMUNICATION SYSTEM WITH DUAL MODE RELAY SENSOR DELIVERY

CROSS REFERENCE TO RELATED APPLICATIONS

This application claims priority to and the benefit of U.S. provisional patent application Ser. No. 63/298,489 filed Jan. 11, 2022, U.S. patent application Ser. No. 17/667,824 filed Feb. 9, 2022, pending; U.S. patent application Ser. No. 17/655,853 filed Mar. 22, 2022, now U.S. Pat. No. 11,995,996 issued May 28, 2024; and U.S. patent application Ser. No. 17/656,175 filed Mar. 23, 2022, now U.S. Pat. No. 11,838,094 issued Dec. 5, 2023, the disclosures of which are incorporated herein by reference.

STATEMENT OF GOVERNMENT INTEREST

The invention described and claimed herein may be manufactured and used by or for the Government of the United States of America for all government purposes without the payment of any royalty.

FIELD OF THE INVENTION

The present invention is related to autonomous, linkable communication systems and more particularly to dynamically customizable delivery of autonomous, linkable communication to adapt to changing hostile environments.

BACKGROUND OF THE INVENTION

Hostile environments can present significant safety and communication challenges, whether indoors or outdoors. For example, an underground facility, multi-story building or an outdoor area having visual obstructions may be used by adversaries to store weapons, personnel, supplies etc. The ability to safely explore such hostile environments is a necessity.

Rather than using friendly personnel for exploration of the hostile environment, autonomous systems are highly desirable for such missions. Autonomous systems operate in the hostile environment without the need for direct human contact during emplacement at the various points of interest within the environment. Such systems may rely upon relay sensors for surveillance and to provide real time intelligence to a human operator remote from the relay sensor.

The relay sensors are strategically placed to provide real time intelligence. The relay sensors may detect and transceive to successive relay sensors data relating to any of or any combination of a microphone, speaker, video camera, thermal imaging camera, infrared camera, radiation detector, explosive detector, GPS location, narcotics detector, thermometer, vibration detector, chemical/biological weapons detector, etc. The relay sensors form no part of the invention, except as may be specifically claimed below.

Such systems typically use wireless signals operating at a 2.4 GHz or 5.8 GHz frequency to tranceive signals between successive relay sensors. Both frequencies rely upon line of sight communications. But if walls, stairs, boulders, tunnels, vehicles, debris, electronic interference, etc. obstruct the line of sight, communication is degraded or even lost. Furthermore, an explosion or deliberate disruption may terminate communication from a previously established and operable network. Wired systems are infeasible for much the same reasons and catastrophic sabotage due to cutting the wire. A chain of wireless relay sensors throughout the hostile environment is therefore preferred.

The relay sensors cannot be preinstalled due to the unknowns and changing conditions of the hostile environment. The relay sensors must be installed as conditions dictate, while maintaining line of sight communications. It is difficult to determine in advance how many relay sensors will be necessary, therefore one must plan for a worst case scenario and have an ample supply of relay sensors.

The relay sensors may be advantageously delivered to the desired location within the hostile environment by drone. Drone delivery provides the benefit of not being hindered by obstructions such as debris, stairways, holes, etc. But drones have limited payload capacity. A drone may not have the battery life, lift or delivery mechanism to carry and dispense multiple relay sensors.

Therefore the drone must retrieve a relay sensor from a stockpile and deliver that relay sensor to the desired location. But as the drone goes deeper into the hostile environment, increased travel and time between the stockpile and delivery site are required to place successive relay sensors. Intelligence gathering is delayed and drone battery life may be exhausted.

Therefore it is desirable to bring the stockpile closer to the successive locations. It may be further desirable to bring the stockpile to and within the hostile environment. The stockpile may be disposed on a moving vehicle for transport to a site for subsequent retrieval by the drone. This arrangement provides a dynamic and tractable home base for the stockpile and for access by the drone.

Attempts have been made in the art as disclosed in: U.S. patent Ser. No. 10/789,567; 10207805; 10134290 and 9841757. But, none of these attempts in the art overcome the problems of dynamic and remote deployment and positioning of relay sensors in a changing hostile environment. The present invention seeks to overcome these problems.

SUMMARY OF THE INVENTION

In one embodiment the invention comprises a communication system for sending surveillance signals from a hostile environment to an operator. The communication system comprises an operably movable tractor having a longitudinal axis and a floor pan. At least one relay sensor for transmitting communication signals is disposed on the floor pan. The tractor has at least one ground relay sensor dispensing mechanism on the floor pan for conveying the at least one relay sensor from the tractor to the ground and a microcontroller for controlling the relay sensor dispensing mechanism and movement of the tractor. The communication system also comprises a drone independently movable with respect to the tractor, the drone being configured to retrieve a relay sensor from the ground and to place that relay sensor at another location.

DETAILED DESCRIPTION OF THE INVENTION

Figure 1:
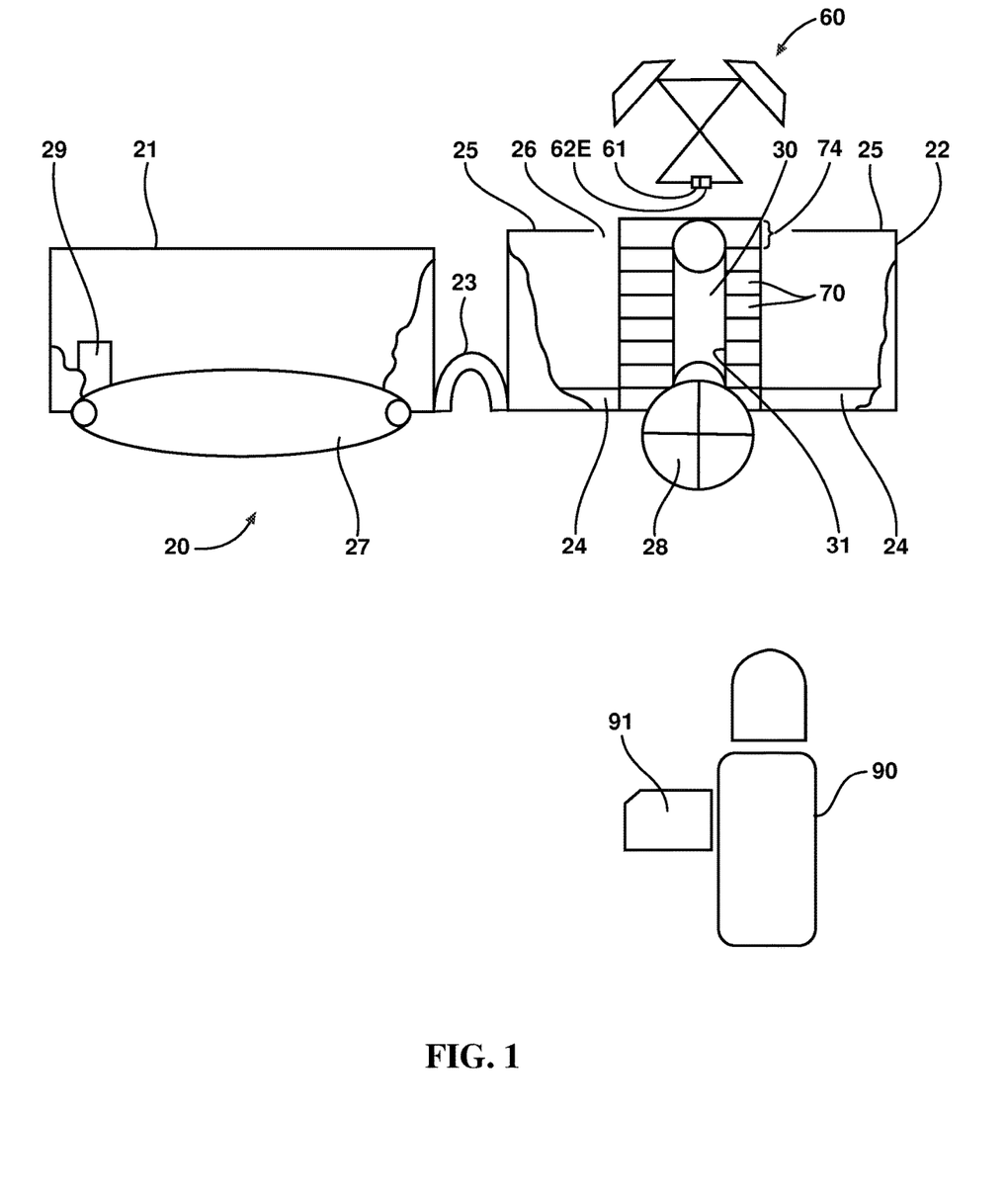
FIG. 1 is a schematic side elevational view of a communication system according to the present invention.

Referring to FIG. 1, a system 20 according to the present invention provides continuous surveillance and real time communication system 20 to one or more operators 90. The system 20 according to the present invention comprises a tractor 21, at least one relay sensor 70 removably disposed on tractor 21 and a drone 60 adapted to retrieve the relay sensor(s) 70 from the stockpile for delivery within the hostile environment. The communication system 20 is portable, for use where a hostile environment may be present. By portable, it is meant that the communication system 20 may be assembled and rapidly deployed in different locations and various situations without undue infrastructure or site preparation. The communication system 20 provides for trilateral communication between one or more tractors 20, one or more drones 60 and one or more operators 90.

Examining the tractor 21 in more detail, the tractor 21 is a mobile vehicle sized for the expected terrain in the hostile environment. The tractor 21 may be wheeled, have tread 27 or combinations thereof, so long as obstacles, turns and other challenges to mobility may be accommodated while hauling the required components. The tractor 21 may be tethered or preferably is wireless. The tractor 21 may have 2 to 25 watts of battery power to carry the intended load of a full stockpile to desired locations within the hostile environment. Preferably the battery provides for up to 3 hours mobility at speeds of 5 to 20 meters per minute, depending upon torque requirements. One or more drive motors 29 may range from 10 amps continuous to 50 amps continuous per channel. The desired stockpile load capacity may be at least 2, 4, 10 or 20 Kg but typically not more than 50 Kg.

The tractor 21 may be autonomously navigated using a camera with illumination for dark environments. The camera may be a 1080P High Definition Red-Green-Blue-Depth (RGB-D) Camera mounted on an articulable bracket for −20° to +75° tilt and +/−190° pan viewing. Optionally, the camera may record to an SD card or other media. The tractor 21 can be controlled from commercially available USB, RC radio, PWM, TTL serial, analog and microcontrollers 91 such as are available from Arduino of Somerville, MA or Raspberry Pi of England and Wales. If desired, an encoder may be used to provide closed loop control to the drive mechanism. Suitable tractors 21 are available from SuperDroid Robots of Fuquay-Varina, NC with modifications to support the stockpile as described below. A SuperDroid Robots MLT-JR tracked robot platform 25 has been found suitable for such modification and may be used in conjunction with a SuperDroids Robots FLYSKY FS-i6X 2.4G 6 Channel Transmitter & Receiver.

Figure 2A:
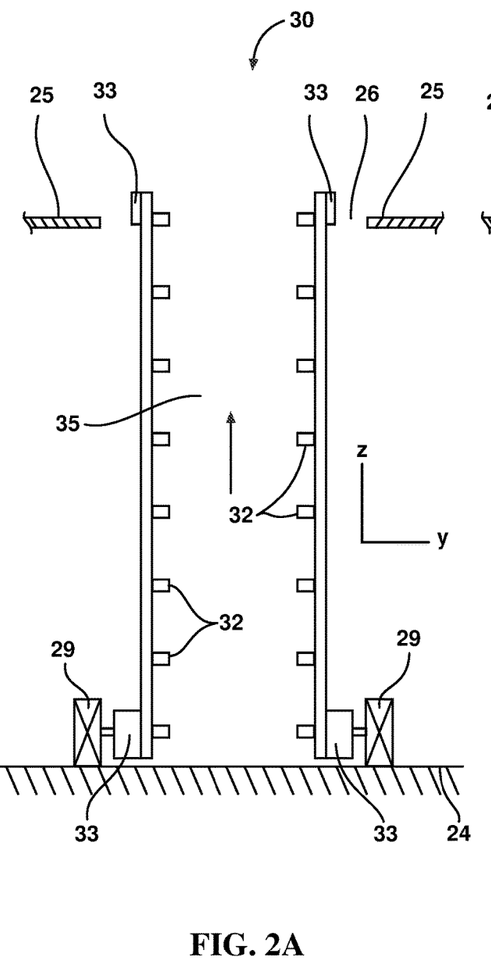
FIG. 2A is a schematic frontal view of an elevator according to the present invention and having plural relay sensors at the top of the elevator.
Figure 2B:
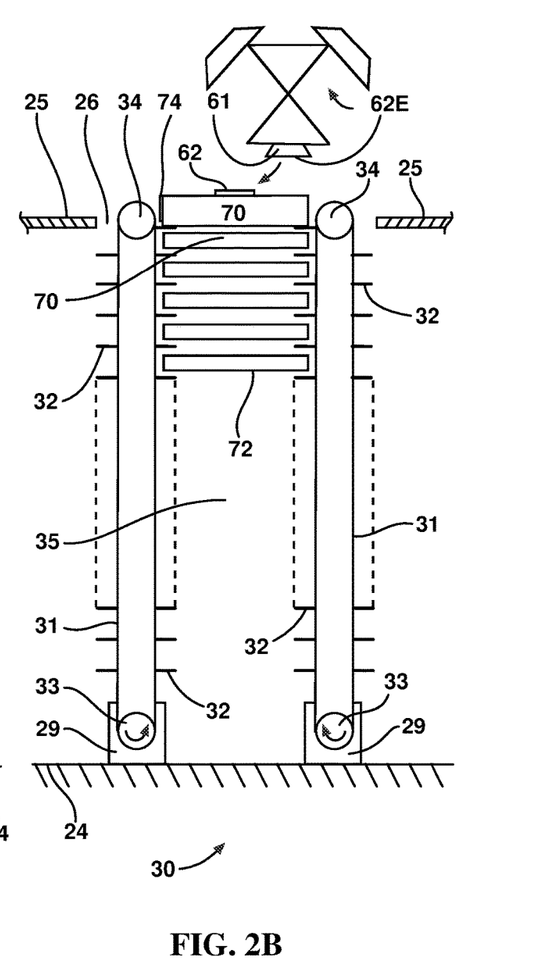
FIG. 2B is a schematic side elevational view of an elevator having two belts on each side.
Figure 3A:
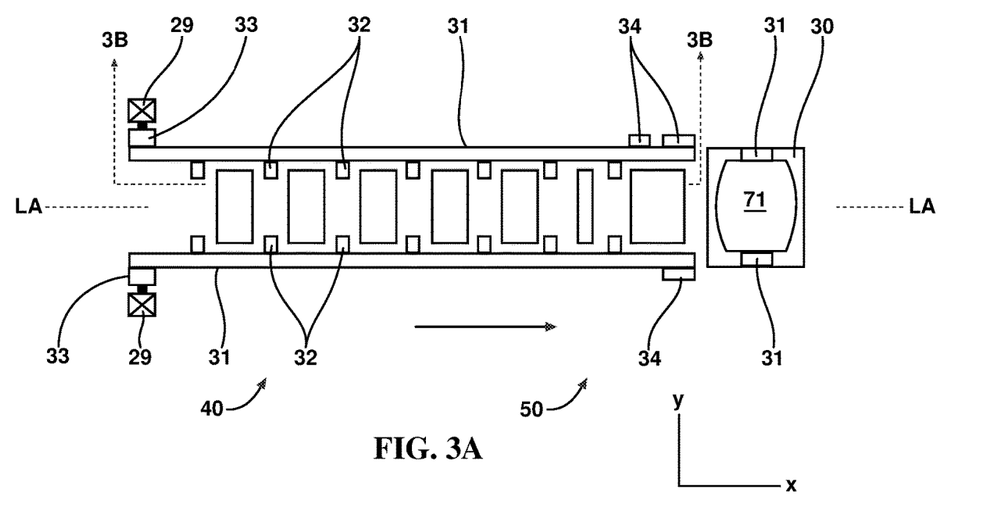
FIG. 3A is a top plan view of an apparatus according to the present invention.
Figure 3B:
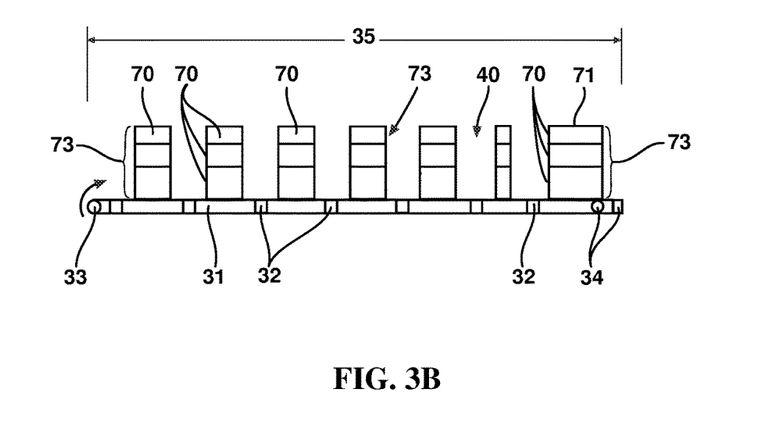
FIG. 3B is an instantaneous sectional view taken along lines 3A-3A of FIG. 3A.

Referring to FIG. 2A and FIG. 2B, tractor 21 locomotion and elevator 30 operation may be controlled by a single commercially available microntroller 91 or each may be controlled by a dedicated microntroller 91. Preferably, such microntroller 91 has at least 8 KB RAM, built-in wifi and at least 16 MHz clock speed. A Rev 3 Mega 2560 microntroller 91 available from Arduino of Somerville, MA has been found suitable. Alternatively, the drive motors 29 may be controlled by a central computer using a servo driver. Such a servo driver may have at least a 64 bit core, 0.5 TFLOPS (FP16) and 1 GHz clock speed with optional recording capability. A Jetson Nano servo driver available from NVIDIA of Santa Clara, CA has been found suitable.

In one embodiment the tractor 21 has a bed 22 for hauling the stockpile of relay sensors 70 on a bed 22. The bed 22 may be rigidly or articulably associated with the tractor 21. The bed 22 contains a relay sensor 70 dispensing mechanism (RSDM 50) as described below. The bed 22 has clearance to navigate through the expected hostile terrain and may have a shock absorbing system to prevent damage to the RSDM 50 and relay sensors 70. The bed 22 has a floor pan 24 for supporting the RSDM 50 and stockpile and may have optional sidewalls to protect the RSDM 50 and stockpile. The tractor 21 and bed 22 have a common a longitudinal axis LA. Prophetically a TS100 tank chassis available from Shenzhen Doctors of Intelligence & Technology (DOIT) powered by a BLDC motor, such as a VMGMV GS152 motor is believed to be usable for such an embodiment.

The longitudinal axis defines a forward direction of movement and rearward movement direction longitudinally opposed thereto. The floor pan 24 has a corresponding front edge and a rear edge opposed thereto.

The top of the bed 22 may have a platform 25 which provides a landing pad for the drone 60, if needed. The platform 25 is preferably nonmagnetic, to avoid interference with optional magnets 62 incorporated into the drone 60 and relay sensor 70. The platform 25 has a hole 26 therethrough to allow for the RSDM 50 to upload relay sensors 70 from the stockpile into a pickup position 74 for retrieval by the drone 60. The platform 25 may have one or more indicia to guide the drone 60 to the desired landing position on the platform 25, particularly relative to the hole 26. Additionally or alternatively, the indicium may be disposed upon the top surface 71 of the relay sensor 70, including on the magnet 62. An ArUco marker available from SourceForge and Slashdot Media of San Diego, CA has been found suitable. Alternatively or additionally, the tractor 21 may have a platform 25 for transport of the drone 60 to and from the hostile environment.

The RSDM 50 is sized to dispense complementary relay sensors 70. The RSDM 50 may be of modular construction for deployment in various locations. For example the RSDM 50 may be loaded onto the bed 22 and remain on the bed 22 throughout the entire mission. Alternatively the RSDM 50 may be offloaded from the bed 22 and be deposited in a stationary position, so that the bed 22 may return to a base station for replenishment with second, third or more RSDMs 50.

In one embodiment the RSDM 50 comprises two angularly offset and preferably mutually perpendicular pairs of continuous and co-acting belts 31 as defined by mutually perpendicular X, Y and Z axes. The continuous belts 31 extend between a driven pulley 33 and an opposed return pulley 34 to create a chute 35 between opposed belts 31. Long chutes 35 may comprise intermediate idler pulleys 34 and/or tensioning pulleys for stability. By co-acting it is meant that the driven pulleys 33 rotate on opposite directions, so that the inner faces of both belts 31 move in the same direction. The paired belts 31 may be cogged, so that the cogs 32 propel the relay sensors 70 in accordance with command increments. The pitch of the cogs 32 is complementary to the geometry of the relay sensors 70. Like geometry relay sensors 70 are used or variable if different geometry relay sensors 70 are used in a stack 73. Alternatively, the belts 31 may be spaced to provide a frictional fit with the relay 70 sensors therebetween.

More particularly, each continuous belt 31 has a driven pulley 33 which is driven by an individual continuous rotation servomotor 29 or by a stepping motor 29. The servomotors 29 for the belts 31 of a particular chute 35 are paired, so that the belts 31 synchronously operate in tandem. The servomotors 29 preferably provide a torque of 25-32 g-m, at 40 to 60 RPM. A Parallax Continuous Rotation model motor 29 available from Parallax of Rocklin, California has been found suitable. In an alternative embodiment, a single drive motor 29 may be used and the two driven pulleys 33 may be linked by another belt, gear train, etc. In an alternative embodiment, a single drive motor 29 may be used and the two driven pulleys 33 may be linked by another belt, gear train, etc. In another alternative embodiment the tractor 21 motor 29 may drive the driven pulleys 33 through use of suitable drive trains comprising belts, shafts and gear trains as are well known in the art.

As shown, at least one chutes 35 is defined by opposing belt 31 pairs. The chutes 35 are illustrated as substantially perpendicular although one of skill will recognize substantial variations of up to +/−45 degrees for both chutes 35 are feasible and within the scope of the invention. The vertical belts 31 define an elevator 30 therebetween. Preferably the vertical belts 31 have cogs 32 disposed on a vertical pitch corresponding to the vertical thickness of the relay sensors 70. The belts 31 may be made of nylon, neoprene, rubber, urethane, etc. to maintain sufficient tension for drive capability and have cogs 32 with compliance for insertion into or between the relay sensors 70. The relay sensors 70 are then trapped between the respective opposed belts 31.

The stockpile comprises one or more stacks 73 of relay sensors 70. Each vertical stack 73 comprises a vertical plurality of relay sensors 70 generally perpendicular to the floor pan 24. The stacks 73 may be manually assembled and disposed in position on the bed 22. While a row of three stacks 73 is illustrated in a non-limiting example, one of skill will recognize that a single stack 73 or any plurality of stacks 73 in the row may be utilized. Furthermore, two or more parallel rows of stacks 73 of relay sensors 70 may be utilized. Each stack 73 may comprise equal or unequal numbers of relay sensors 70 and range from 2 to 20 or 3 to 8 relay sensors 70 in each stack 73.

In a first embodiment, individual relay sensors 70 are uploaded to or through the hole 26 to an elevation at or above the platform 25. In such an embodiment, the vertical chute 35 is disposed coincident with and sized to fit through the hole 26 and functions as an elevator 30 chute 35. The vertical chute 35 is defined by opposed paired belts 31 preferably extending from a proximal end juxtaposed with floor pan 24 to a distal end juxtaposed with or preferably above the platform 25, thereby providing an elevator 30 for the relay sensors 70. The drive pulleys may be at either end of the belts 31 but are preferably at the floor pan 24 to lower the center of gravity with a direct drive motor 29 and conserve landing space by not having one or more motors 29 on the platform 25. Each vertical belt 31 may be supported by a respective vertical stanchion and an axle of the bed 22 may be disposed under the elevator 30 for support.

A stack 73 of relay sensors 70 is disposed in the chute 35. Upon command from the microntroller 91, the belts 31 are indexed one pitch to vertically advance any relay sensor(s) 70 in the chute 35. Vertical advance continues until a relay sensor 70 protrudes through the hole 26 to or is disposed coplanar with the top surface 71 of the platform 25 to be in a pickup position 74 for retrieval by the drone 60. When a relay sensor 70 is in a pickup position 74, it is operably disposed in a position for pickup by the drone 60. The drone 60 picks up the relay sensor 70 using a relay sensor pickup (RSP 61) for subsequent placement at the desired location within the hostile environment. The top position in the chute 35 is now empty, and the belts 31 are vertically advanced one pitch to dispose the next relay sensor 70 in the pickup position 74. If desired, vertical guide vanes may be used to confine a stack 73 of the relay sensors 70 within the elevator 30 and reduce tipping or jamming.

The elevator 30 may have two or more cooperating belts 31 on each side. This arrangement provides the benefit of increased stability for sensors 70, particularly as the center of gravity goes higher as more sensors 70 are depleted from the bottom of the elevator 30.

The RSDM 50 may comprise one or more linear actuators. The linear actuator has at least one ram. The at least one ram may be parallel to the longitudinal axis LA or may be skewed. Two rams are shown, operating in opposed longitudinal directions, although one of skill will recognize the invention is not so limited. The linear actuator may operate to dispense relay sensors 70 from a single stack 73 or may dispense relay sensors 70 from a plurality of adjacent stacks 73 as shown at the right side of the bed 22. The linear actuator should have a ram with a travel sufficient to urge the relay sensor 70 from the bottom position of the vertical stack 73 to the to the ramp or hole where the relay sensor 70 is displaced to the ground under the influence of gravity. A suitable linear actuator is available from Actuonix® Motion Devices Inc of Saanichton, BC, Canada under model number L12-100-50-6-R.

Each stack 73 of relay sensors 70 may be held in place and/or laterally supported with a baffle. The stack 73 of relay sensors 70 may optionally be spring biased from the top of the baffle for stability. Two linear actuators may be utilized with respective rams operable towards respective, juxtaposed vertical stacks 73 of relay sensors 70. The rams of the two linear actuators may operate in opposed directions and/or may operate parallel to the longitudinal axis LA. The plurality of linear actuators may be operable in the same direction, opposed directions, skewed directions and sized for different form factors and weights of relay sensors 70.

The RSDM 50 may comprise a linear actuator operatively associated with a hole through the floor pan 24. The hole may be tapered to minimize occurrences of the relay sensor 70 landing upside down or in a skewed position.

As the desired location is approached, again, the tractor 21 may stop or deploy the relay sensor 70 on the fly under dynamic conditions. The ram extends and again pushes the bottom relay sensor 70 forward, in the extension direction of the ram. This embodiment provides the benefit of fewer moving parts since the hole preferably does not have a cover.

The embodiments of the present invention provide the benefit of ground dispensing of the relay sensors 70. The ground dispensing may be accomplished through the hole in the floor pan 24 to the ground or via the ramp extending from the ramp to the ground.

One of skill will recognize the present invention provides the benefit that three, or more, relay sensors 70 may be dispensed at the same time or very close in time. A first relay sensor 70 may be raised upwards by the elevator 30 to the top position near the platform 25 of the tractor 21 for pickup by the drone 60. A second relay sensor 70 may be dropped through the hole. A third relay sensor 70 may be slid down the ramp. The first, second and third relay sensors 70 may be simultaneously deployed in parallel or consecutively deployed in rapid fashion. This embodiment provides the benefit that the communication system 20 can rapidly carry out its mission and communications begin to address the hostile environment.

Figure 4:
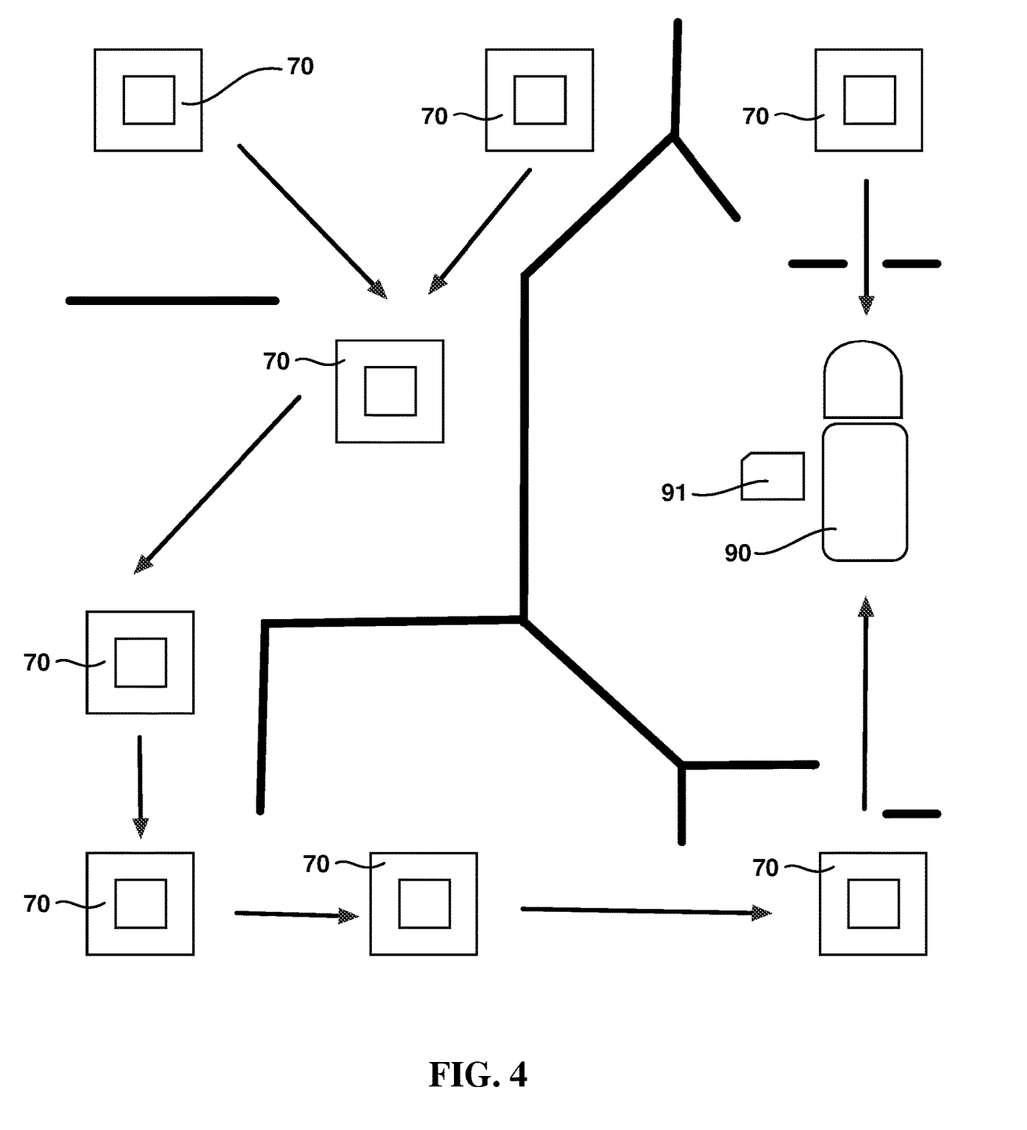
FIG. 4 is a schematic top plan view of a system having plural relay sensors deployed in a hostile environment and sending surveillance signals to an operator.

Referring to FIG. 4, the relay sensor 70 performs the function of relaying signals from an upstream relay sensor 70 to a downstream relay sensor 70 and back. The last relay sensor 70 in the train sends the signal, and corresponding data, to an operator 90 for interpretation, analysis and action. Preferably each relay sensor 70 is capable of sensing a hazard and originating the signal. The relay sensor 70 may additionally or alternatively serve the function of amplifying the surveillance signal, providing supplies, providing ordnance, written information, etc. In such a mission, the RSDM 50 may deploy objects other than the relays sensors described herein.

The relay sensor 70 has a form factor complementary to the elevator 30 and to the hole 26. While the sensors are shown as being generally parallelepidally shaped, one of skill will recognize the invention is not so limited and many form factors are suitable. The relay sensor 70 may have opposed sides with pockets complementary to the cogs 32 and to receive the cogs 32 for stability during transport. Optionally all four sides may have pockets to provide flexibility for different widths of chutes 35.

This arrangement provides that the RSDM 50 may have a modular construction, and the bed 22 can be customizable to accommodate a variety of relay sensors 70, as desired for a particular mission. A first RSDM 50 may be sized for a first stockpile of relay sensors 70 having a first form factor and then disposed on the bed 22 for use in the mission. A second stockpile of relay sensors 70 may be desired for another mission. Accordingly, a second RSDM 50 may be sized for a second stockpile of relay sensors 70 having a second form factor and disposed on the bed 22 to replace the first RSDM 50. And so on. Of course, if feasible, any of the RSDMs 50 may be manually placed in the hostile environment for subsequent dispensing of the relay sensors 70 and disbursement by the drone 60 as needed with the hostile environment.

In one embodiment, the top of the relay sensor 70 has a passive magnet 62, which may be coplanar with the top surface 71 of the relay sensor 70 or protrude outwardly therefrom. The magnet 62 co-acts with an electromagnet 62E juxtaposed with the bottom of the drone 60 and functionally acting as the RSP 61. The system 20 is preferably active low, so that the magnets 62, 62E attract without being energized, to conserve battery life of the drone 60, although the opposite active high arrangement using attraction during flight is deemed feasible and within the scope of the claimed invention. Upon reaching the desired location, the electromagnet 62E on the drone 60 is activated and the magnets 62, 62E repel. The relay sensor 70 is dropped from the drone 60 and deposited in the desired location.

The drone 60 is preferably a quadcopter as is well known to one of skill, although the invention is not so limited and includes any aircraft suitable for retrieving the relay sensors 70 from the RSDM 50 and depositing the relay sensors 70 at desired locations. The drone 60 may be tele-operable, but preferably has autonomous navigation capability or a combination thereof. The drone 60 has a flight controller 91 which communicates through a ROS service API as provided by ROSflight io. Sensor data, such as IMU measurements, may be streamed from the flight controller 91 to a companion computer as ROS topics. Control setpoints may be sent to the flight controller 91 by publishing to the appropriate ROS topic. Except as specifically claimed below, the drone 60 forms no part of the invention. A ReadytoSky S500 frame with four MN-3110 (780 kV) T motors available from AliExpress.com has been found suitable. A suitable associated quadrotor flight controller 91 is a Ready-To-Fly-Quads Flip 32 which has been flashed with ROSflight.

Figure 5:
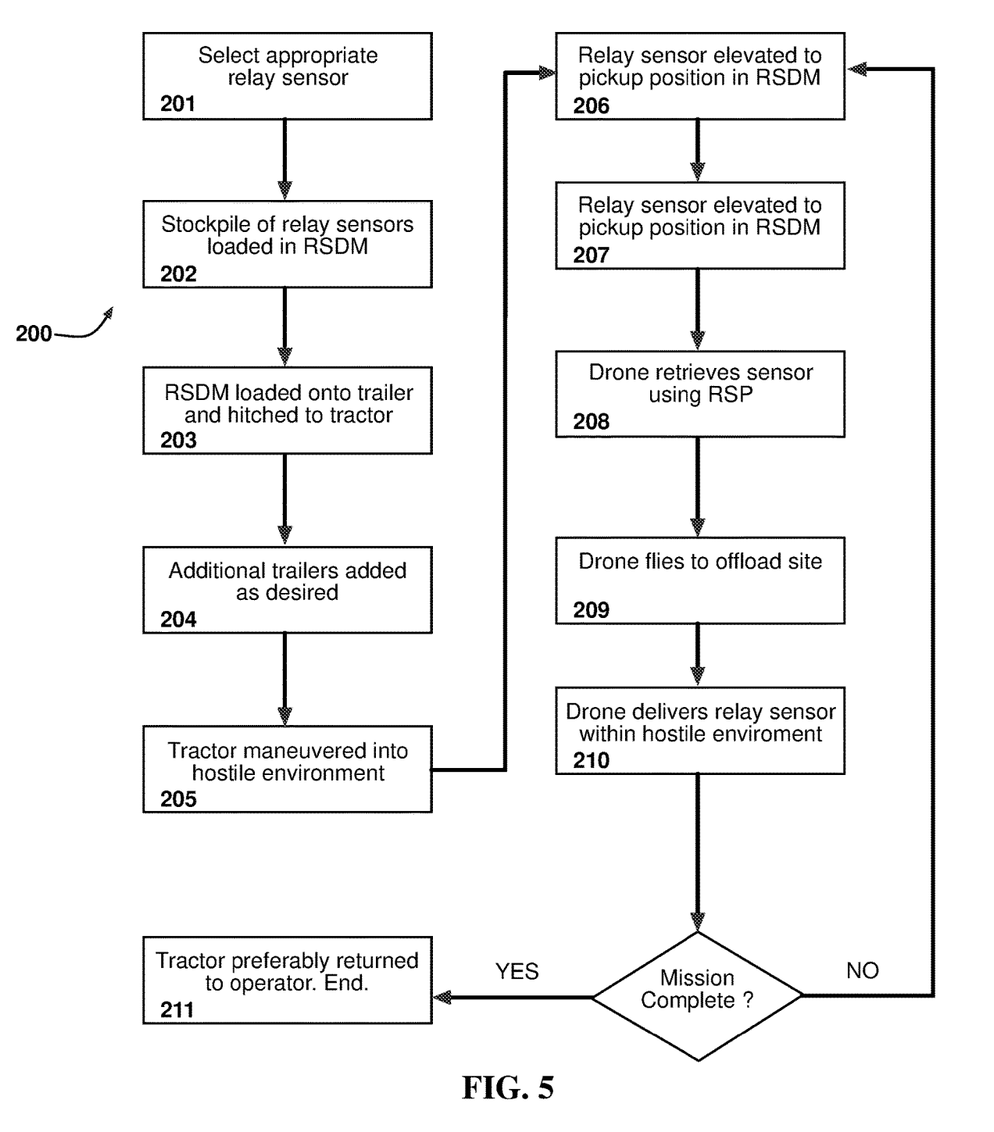
FIG. 5 is an exemplary flow chart of the steps of a mission using the system and method of the present invention.

Referring to FIG. 5, in operation the invention may be carried out using the method 200 as follows. An appropriate type of relay sensor 70 is selected for the specific mission at hand 201. A RSDM 50 suitable for that relay sensor 70 is loaded with a stockpile of the relay sensors 70 comprising any suitable number of stacks 73 for that particular mission 202 and securely disposed on the bed 22 at a safe loading site 203, it being recognized that steps 202 and 203 can be performed in either order. Latches and threaded fasteners may be used to secure the RSDM 50 in known fashion. Additional beds 22 with stockpiles/RSDMs 50 may be hitched behind the first bed 22, as desired 204. This arrangement provides the benefit that the number of available relay sensors 70 increases by providing more RSDMs 50 with respective stockpiles. Of course any RSDM 50 may be fully loaded to capacity to maximize signal coverage or partially loaded to conserve tractor 21 battery life. Alternatively or additionally, convoyed beds 22 may have two or more different types of relay sensors 70, with respective different RSDMs 50. The convoyed arrangement provides the benefit that a first bed 22 may have a first type of relay sensor 70 with a respective RSDM 50, a second convoyed bed 22 may have a second type of relay sensor 70 with a respective RSDM 50, etc. for different surveillance needs. The drone 60 may be loaded onto the platform 25 of the bed 22 for transport into the hostile environment or may be separately flown in from the safe location.

After the bed(s) 22 are loaded at the safe location, the tractor 21 is guided to into the hostile environment 205. A first offload site is selected 206 and the tractor 21 may stop thereat. While the tractor 21 is stationary, the elevator 30 is actuated and a first relay sensor 70 brought into the pickup position 74 upon command 207. The drone 60 hovers above the relay sensor 70 or lands on the platform 25 and using the RSP 61, the passive magnets 62 on the drone 60 and top of the relay sensor 70 mutually attract, attaching the first relay sensor 70 to the drone 60 in temporary and controllable fashion 208. The drone 60 flies to the offload site, lands and activates the electro-magnet 62E. The repulsive forces of the electromagnet 62E drops the relay sensor 70 into position 209. If the mission is not completed the drone 60 returns to the bed 22 to repeat the process 210. If the mission is completed, the tractor 21 may return to a safe location for restoration and reuse 211.

Optionally, the elevator 30 may be actuated while the tractor 21 is in motion to save time and/or the drone 60 may retrieve and pick up the relay sensor 70 while the tractor 21 and bed 22 are in motion. Optionally, the drone 60 may deposit the relay sensors 70 while in flight, to conserve landing/takeoff time and battery life.

Figure 6:
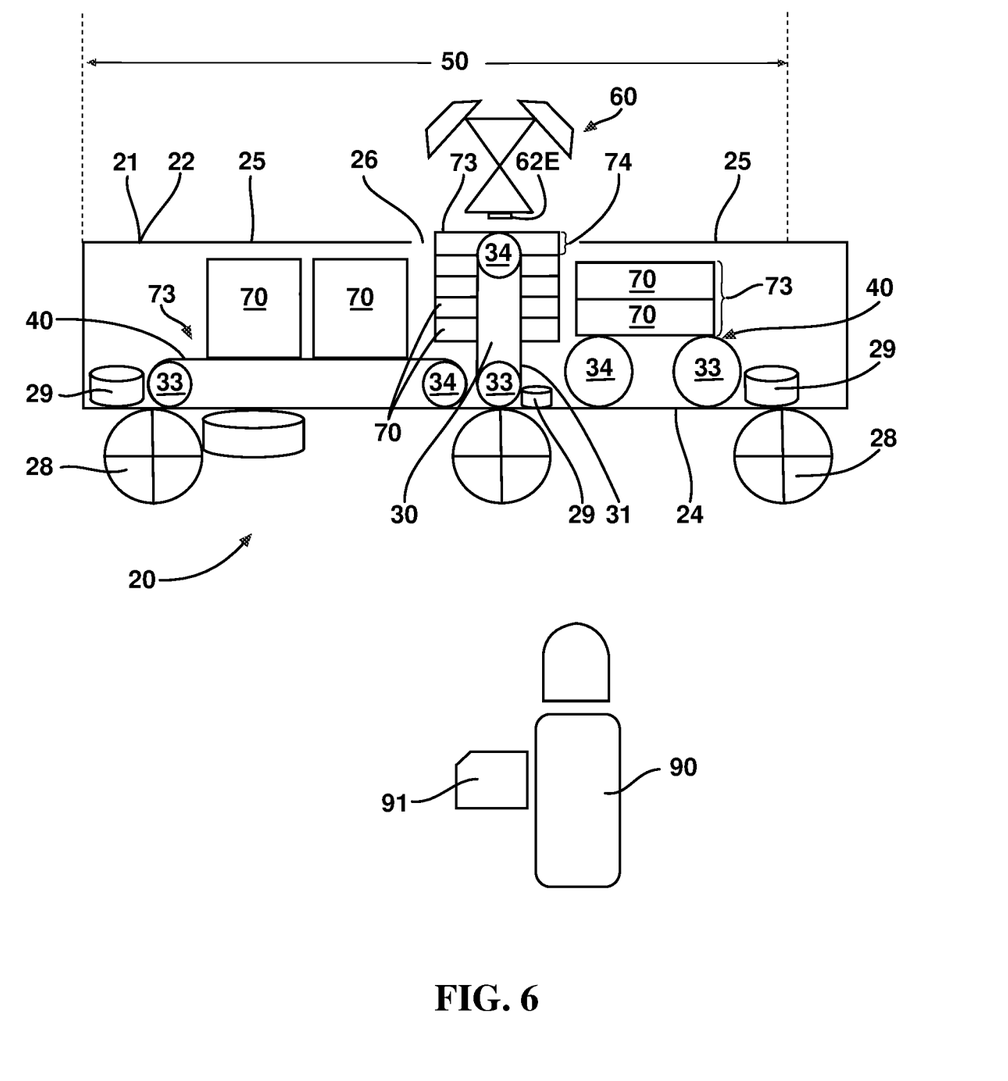
FIG. 6 is a side elevational view of an embodiment having two belts which feed towards a common elevator.

When an adequate number of relay sensors 70 is in place, including a single relay sensor 70 in a degenerate case, communication to an operator 90 commences. When the stockpile(s) is/are exhausted, the tractor 21 may return to the safe location for replenishment. The drone 60 may remain in position to conserve battery life or may ride back on the platform 25 of the tractor 21 or bed 22 for restoration, charging from the tractor 21 and/or battery replacement. The process is repeated, as needed throughout the mission. As shown in FIG. 6, the RSDM 50 may comprise one or more belts 40 which convey the relay sensors to the elevator 30.

Figure 7A:
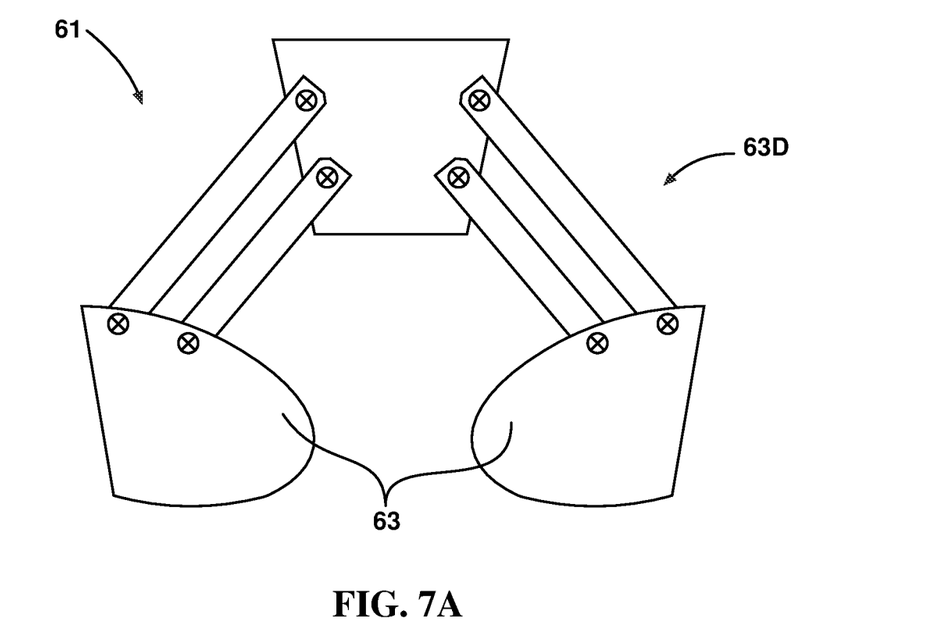
FIG. 7A is a schematic side elevational view of a four bar mechanism claw suitable for use as a relay sensor pickup.
Figure 7B:
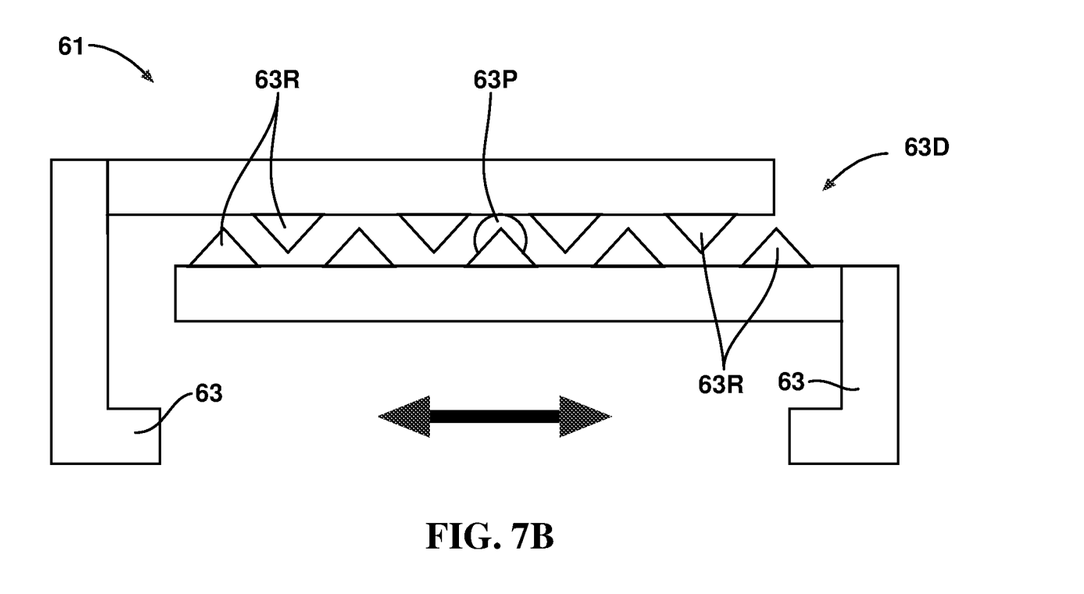
FIG. 7B is a schematic side elevational view of a rack and pinion gear claw suitable for use as a relay sensor pickup.

Referring to FIG. 7A and FIG. 7B, in an alternative embodiment, the RSP 61 may comprise a mechanical claw 630. The mechanical claw 630 has at least two opposed jaws 63. Each jaw 63 may be a four bar mechanism geared together with the opposing jaw 63 and controlled in known fashion by a prismatic joint. Alternatively, opposed jaws 63 of the RSP 61 may be disposed on a rack gear 63R and driven towards/away from each other by a pinion gear 63P. The jaws 63 of the RSP 61 open a distance sufficient to span any XY dimension of the relay sensor 70. The drone 60 lowers the jaws 63 into position and the jaws 63 lightly compress opposed sides of the relay sensor 70 for pickup. A rectangular relay sensor 70 may be used in conjunction with a RSP 61 having four jaws 63 arranged in two opposed pairs. A round relay sensor 70 may have a RSP 61 with three jaws 63 at 120 degrees out, etc.

In any such execution, the jaws 63 are preferably driven in known fashion by a dedicated servomotor 29 using the aforementioned controller 91. The servomotor 29 may have a working voltage of 6V to 8.4V, no load current of 100 mA and a lock rotor torque of 0.8 kg.-cm at 7.4V, as found on a Robo-Soul LDX-335MG servomotor 29 available from Lobot Robot of Shenzhen, Guangdong, China. Prophetically a model RNAB08WPZ9FGW claw 630 available from Swaytail of China or a model G6 claw 630 sold by SZDoit of China are suitable.

Alternatively, an expanding claw 630 may be utilized. Such a claw 630 has jaws 63 made of spring steel with a memory to expend when released from an encasing sheath, as is known. As the jaws 63 longitudinally protrude from the encasing sheath the memory causes the jaws 63 to radially expand to the size of the relay sensor 70. The jaws 63 are retracted and relay sensor 70 is picked up for later placement by the drone 60. A Performance Tool W1184C Steel Claw Mechanical Pick-Up Tool & Retriever may prophetically serve as a model for such a RSP 61. Any of the RSPs 61 described herein may have illumination, to assist an operator 90 for guidance with a video camera during the relay sensor 70 pickup and delivery.

Figure 8A:
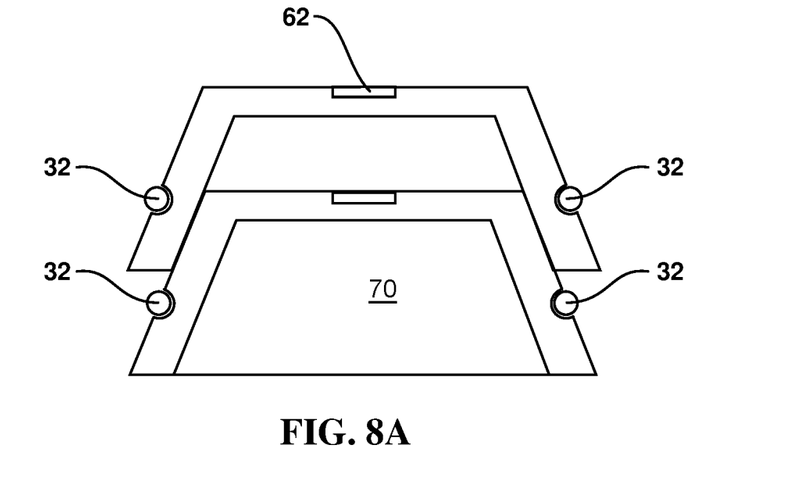
FIG. 8A is a schematic side elevational view of a stack of tapered relay sensors having pockets for receiving belt cogs therein, the cogs being shown fragmentary.

Referring to FIG. 8A, if desired the relay sensors 70 may have a form factor which provides for nesting. In a first embodiment, the relay sensor 70 may taper outwardly as the bottom surface 72 is approached. This geometry provides for spacing of one relay sensor 70 from the next, to allow convenient insertion of the belt 31 cogs 32 between the relay sensors 70. Furthermore, the smaller top surface 71 advantageously lowers the center of gravity, for increased stability during fight. The nested configuration prophetically provides more stability for the stack 73 of relay sensors 70.

Prophetically the jaws 63 may be constructed to allow the drone 60 to pick up and retrieve two or more relay sensors 70 in a single tranche. This arrangement provides the benefit that the drone 60 may be deliver two or more relay sensors 70 without returning to the tractor 21 between deliveries.

Figure 8B:
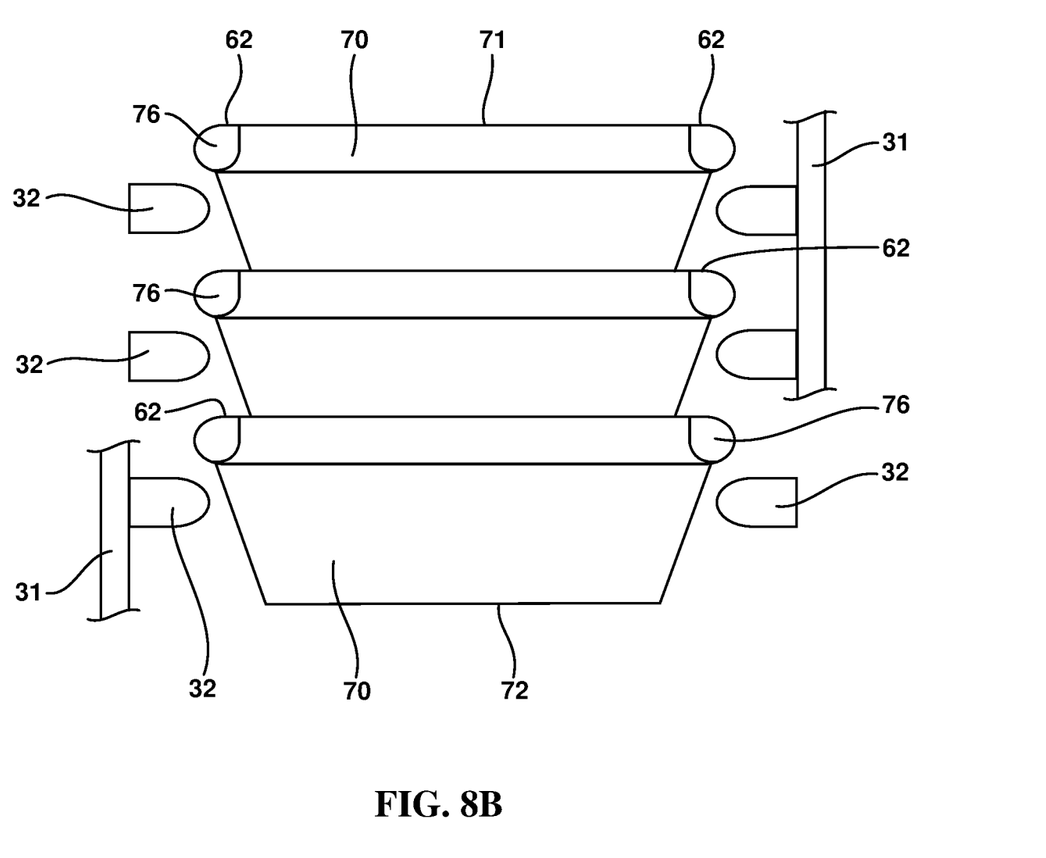
FIG. 8B is a schematic side elevational view of a stack of tapered relay sensors having an annular rim for receiving belt cogs thereunder, the cogs being shown on fragmentary belts.

Referring to FIG. 8B in a second embodiment, the relay sensor 70 may taper inwardly as the bottom surface 72 is approached. This arrangement provides the benefit that the top surface 71 may have an annular rim 76, which allows for larger and concave shaped cogs 32 to be utilized for increased security during handling. Prophetically the concave cogs 32 may subtend from about 20 to about 45 degrees of the annular rim 76. Furthermore, an annular magnet 62 may be disposed on an annular rim 76, increasing target area for pickup by the drone 60. Both such nested relay sensor 70 geometries provide the benefit of increased stability in the stack 73, particularly while moving on the elevator 30.

Figure 9:
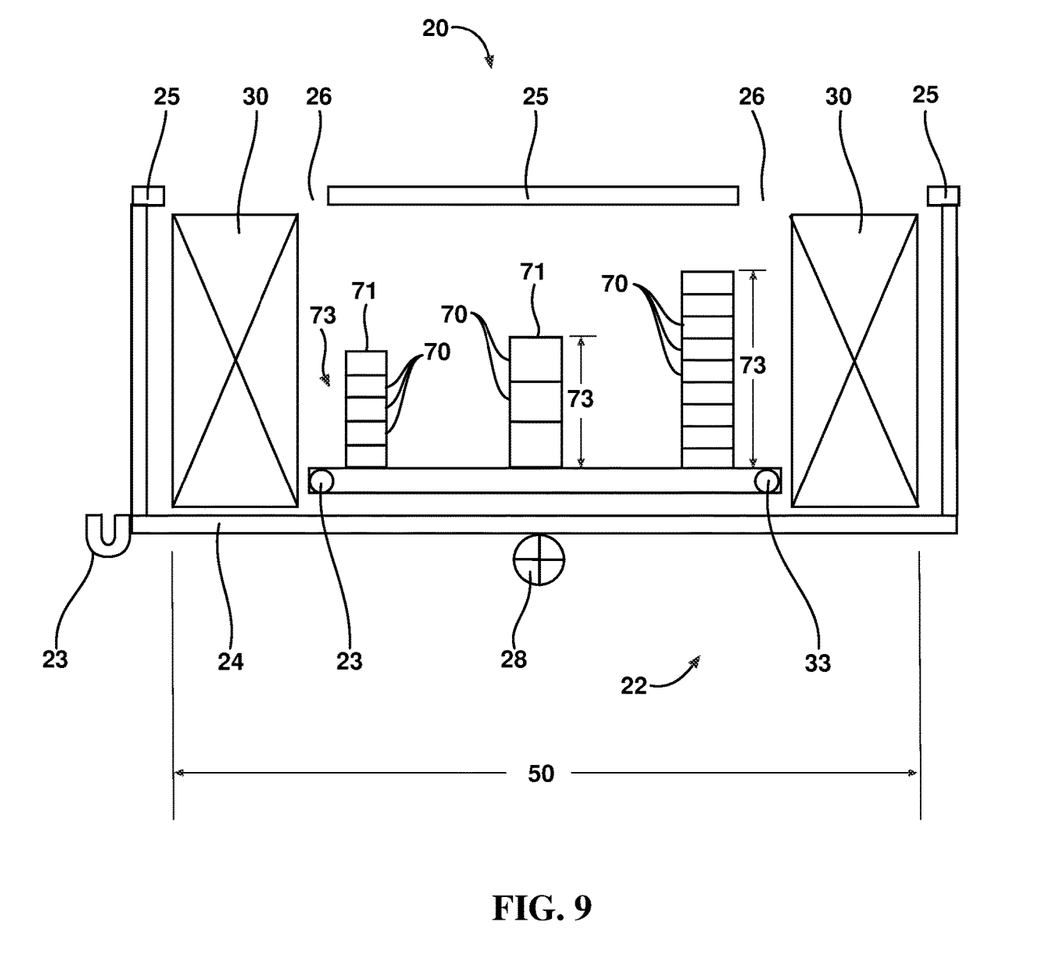
FIG. 9 is a side elevation view of a single axle system according to the present invention having longitudinally opposed plural elevators.
Figure 10:
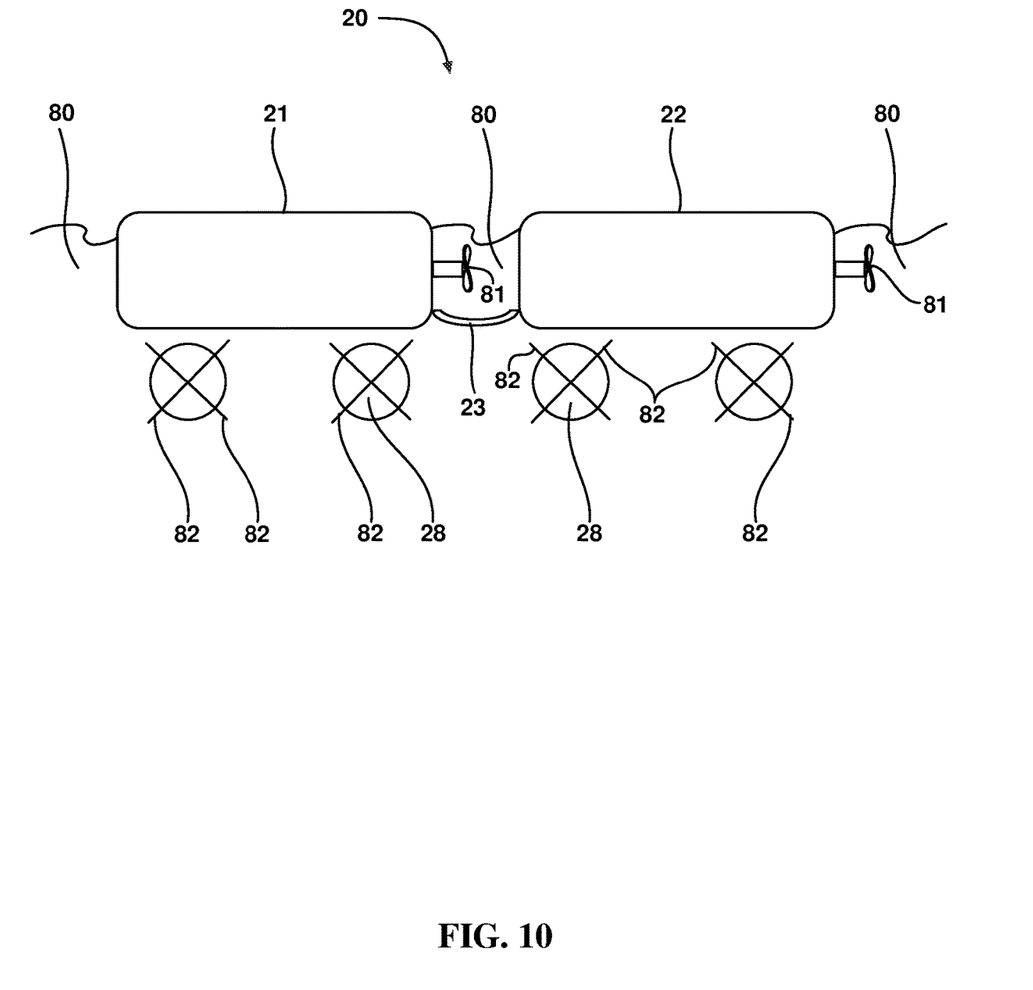
FIG. 10 is a schematic side elevational view, of an amphibious tractor according to an embodiment of the present invention.

Referring to FIG. 9, the system 20 may comprise a straight axle 28 having two or more elevators 30. The elevators may be serviced by a common feed system or dedicated feed systems. Referring to FIG. 10, if desired the tractor 21 may have amphibious capability. For such an embodiment, the tractor 21 may have a motor 29 driven propeller 81 and/or tires with fins 82, as are known in the art. The tractor 21 may be an amphibian for both land and water 80 use, or strictly amphibious. This arrangement provides the advantage that the system 20 of the claimed invention is not deterred by certain water 80 hazards and may even be used with ponds, streams and lakes. Prophetically, a chassis similar to that found in commercially available remotely operated vehicles such as the Free to Fly RC Car available from Wind Toys & Hobby Co., Limited of Hong Kong or the BeeBean Amphibious Remote Control Car available from Hosim Trading, Inc. of China may be suitable for use with an amphibious embodiment of the claimed invention. The relay sensors 70 used with the amphibious embodiment may be waterproof and float or sink, as desired. If desired, two or more tactors 21 may be convoyed together with a hitch 23 for both of the amphibious and land-based embodiments.

What is claimed is:

1. A communication system for sending surveillance signals from a hostile environment to an operator, the system comprising:
   an operably movable tractor having a longitudinal axis and being movable in a forward direction, the tractor having a floor pan with a front edge and a rear edge opposed thereto;
   at least one relay sensor for transmitting communication signals disposed on the floor pan, wherein the at least one relay sensor comprises a vertical stack of a plurality of relay sensors with a bottom relay sensor disposed on the floor pan;
   at least one ground relay sensor dispensing mechanism on the floor pan for conveying at least one relay sensor from the tractor to the ground, wherein the at least one ground relay sensor comprises a linear actuator configured to urge the bottom relay sensor towards a ground conveyance declivity;
   a microcontroller for controlling the relay sensor dispensing mechanism and movement of the tractor; and
   a drone independently movable with respect to the tractor, the drone being configured to retrieve a relay sensor from the ground and to place that relay sensor at another location.

2. A communication system according to claim 1 wherein the ground conveyance declivity comprises an articulable ramp, the ramp being articulable from an upright position for transport of the tractor to a deployed position for declination of a relay sensor from the floor pan of the tractor to the ground, the ramp having a proximal end juxtaposed with the rear edge of the floor pan and a distal end configured to reach the ground in the deployed position.

3. A communication system according to claim 1 wherein the ground conveyance declivity comprises a hole through the floor pan, the hole being sized to permit passage of a respective relay sensor therethrough.

4. A communication system according to claim 1 wherein the linear actuator has a ram suitable for being in a retracted position during transport and actuating to an extended position for moving a relay sensor from the plurality of relay sensors towards one of a hole through the floor pan or a ramp articulable from a proximal end so that a distal end thereof can reach the ground.

5. A communication system according to claim 4 further comprising a baffle intermediate the ram and the ground conveyance declivity, the baffle being configured to provide lateral support for the vertical stack of relay sensors and having a slot for allowing the bottom relay sensor of the vertical stack to pass therethrough towards the ground conveyance declivity in response to urging by the ram of the linear actuator.

6. A communication system for sending surveillance signals from a hostile environment to an operator, the system comprising:
    an operably movable tractor having a longitudinal axis and being movable in a forward direction, the tractor having a floor pan with a front edge and a rear edge opposed thereto and a platform above the floor pan suitable for landing a complementary drone thereon;
    at least two spaced apart relay sensors for transmitting communication signals;
    a first vertical stack of relay sensors disposed in an elevator configured to incrementally raise the relay sensors upwards towards the platform;
    a second stack of relay sensors juxtaposed with a baffle configured to provide lateral support therefor, the baffle further having a slot to allow passage therethrough of a relay sensor at the bottom of the second stack and towards a ground conveyance declivity in response to urging by a ram of a linear actuator disposed on the floor pan;
    a microcontroller for independently controlling tractor movement, the elevator and the linear actuator; and
    a drone independently movable with respect to the tractor, the drone being configured to land on the platform and to retrieve a relay sensor from the ground and to place that relay sensor at another location.

7. A communication system according to claim 6 wherein the elevator and linear actuator are simultaneously operable to deliver a first relay sensor to an elevation at or above the platform to be retrieved by the drone and to urge a second relay sensor towards a ground conveyance declivity for conveyance to the ground, respectively.

8. A communication system according to claim 7 wherein the ground conveyance declivity comprises an articulable ramp, the ramp being articulable from an upright position for transport of the tractor to a deployed position for declination of a relay sensor from the floor pan of the tractor to the ground, the ramp having a proximal end juxtaposed with the rear edge of the floor pan and a distal end configured to reach the ground in the deployed position.

9. A communication system according to claim 7 wherein the ground conveyance declivity comprises a hole through the floor pan, the hole being sized to permit passage of a respective relay sensor therethrough.

10. A communication system according to claim 7 wherein one of the drone and the first relay sensor has an electromagnet and the other of the first relay sensor and drone has a complementary surface for attraction thereto whereby activation of the electromagnet causes the drone to pick up and carry the first relay sensor.

11. A communication system according to claim 7 wherein the ram of the linear actuator is extendable towards the rear edge of the floor pan.

12. A communication system according to claim 11 wherein the ram of the linear actuator is extendable parallel to the longitudinal axis.

13. A communication system for sending surveillance signals from a hostile environment to an operator, the system comprising:
    an operably movable tractor having a longitudinal axis and being movable in a forward direction, the tractor having a floor pan with a front edge and a rear edge opposed thereto;
    at least one relay sensor for transmitting communication signals disposed on the floor pan;
    a first linear actuator having a ram extendable towards a hole through the floor pan;
    a first vertical stack of relay sensors juxtaposed with the first linear actuator whereby extension of the ram pushes a first relay sensor from the first stack to the hole whereby the first relay sensor can fall through the hole;
    a second linear actuator having a ram extendable towards a ramp, the ramp being articulable from an upright position to a deployed position whereby a relay sensor thereon can slide down the ramp;
    a second vertical stack of relay sensors juxtaposed with the second linear actuator whereby extension of the ram pushes a first relay sensor from the second stack to the articulable ramp whereby the second relay sensor can travel down the ramp;
    at least one ground relay sensor dispensing mechanism on the floor pan for conveying at least one relay sensor from the tractor to the ground;
    a microcontroller for controlling the first linear actuator, the second linear actuator and movement of the tractor; and
    a drone independently movable with respect to the tractor, the drone being configured to retrieve a relay sensor dispensed through the hole or down the ramp and to place that relay sensor at another location.

14. A communication system according to claim 13 wherein the first linear actuator and second linear actuator are operable in opposed directions.

15. A communication system according to claim 13 wherein the first linear actuator and the second linear actuator are simultaneously actuatable while the tractor is in motion.

16. A communication system according to claim 13 whereby the articulable ramp has a proximal edge juxtaposed with and articulable from the rear edge of the floor pan.

17. A communication system according to claim 16 further comprising a first baffle supporting the first stack of relay sensors and disposed intermediate the first stack of relay sensors and the hole and further comprising a second baffle supporting the second stack of relay sensors and disposed intermediate the second stack of relay sensors and the proximal edge of the ramp.

18. A communication system according to claim 17 wherein the second vertical stack of relay sensors is juxtaposed with a third vertical stack of relay sensors, whereby the second ram is actuatable to urge a relay sensor form the bottom of the third stack onto the ramp when the ramp is in a deployed position.

\* \* \* \* \*